US012188781B2

(12) United States Patent
Gilbert-Eyres et al.

(10) Patent No.: US 12,188,781 B2
(45) Date of Patent: Jan. 7, 2025

(54) LOCATION ASSISTANCE SYSTEM

(71) Applicant: GM GLOBAL TECHNOLOGY OPERATIONS LLC, Detroit, MI (US)

(72) Inventors: Matthew E. Gilbert-Eyres, Rochester, MI (US); Eric T. Hosey, Royal Oak, MI (US); Russell A. Patenaude, Macomb Township, MI (US); Dipankar Pal, Sylvania, OH (US); Andrew J. MacDonald, Grosse Pointe Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 244 days.

(21) Appl. No.: 17/892,066

(22) Filed: Aug. 20, 2022

(65) Prior Publication Data

US 2024/0060794 A1  Feb. 22, 2024

(51) Int. Cl.
*G01C 21/00* (2006.01)
*G01C 21/36* (2006.01)

(52) U.S. Cl.
CPC ..... *G01C 21/3874* (2020.08); *G01C 21/3605* (2013.01); *G01C 21/3841* (2020.08)

(58) Field of Classification Search
CPC ............ G01C 21/3874; G01C 21/3605; G01C 21/3841; G01C 21/383; G01C 21/20; G01C 21/00; G08B 7/066
See application file for complete search history.

(56) References Cited

U.S. PATENT DOCUMENTS

| 2019/0096262 | A1* | 3/2019 | Dotzler | ................ G07C 5/0816 |
| 2021/0031681 | A1* | 2/2021 | Patnaik | ............ B60W 50/0205 |
| 2021/0049909 | A1* | 2/2021 | Tucker | ................... B60Q 1/525 |

(Continued)

FOREIGN PATENT DOCUMENTS

| KR | 20110066587 | * | 6/2011 |
| KR | 101443743 B1 | * | 9/2014 |

(Continued)

OTHER PUBLICATIONS

Machine Translation of KR20110066587A (Year: 2011).*

(Continued)

*Primary Examiner* — Sahar Motazedi
(74) *Attorney, Agent, or Firm* — Quinn IP Law (57) ABSTRACT

A location assistance system includes a distress vehicle and multiple assistance vehicles. The distress vehicle broadcasts an emergency signal. The assistance vehicles are operable to receive the emergency signal, determine multiple distances to the distress vehicle, triangulate among the assistance vehicles to generate a spatial map of the distress vehicle relative to the assistance vehicles, determine one or more approximately horizontal lines in the spatial map that include the distress vehicle and at least one horizontally aligned assistance vehicle in response to the distress vehicle and the at least one horizontally aligned assistance vehicle being on a same vertical level in the spatial map, coordinate among the assistance vehicles to determine one or more horizontal sequences along the one or more approximately horizontal lines, and flash the of the assistance vehicles in the one or more horizontal sequences to lead toward the distress vehicle.

20 Claims, 7 Drawing Sheets

(56) References Cited

U.S. PATENT DOCUMENTS

2021/0373563 A1* 12/2021 Christensen ......... G08G 1/0133
2024/0046719 A1*  2/2024 McZeal, Jr. ............ H04W 4/90
2024/0059323 A1*  2/2024 Gerrese ................. B60Q 9/008

FOREIGN PATENT DOCUMENTS

KR      20140124267 A  * 10/2014
KR      20160032832 A  *  3/2016

OTHER PUBLICATIONS

Machine Translation of KR101443743B1 (Year: 2014).*
Machine Translation of KR20140124267A (Year: 2014).*
Machine Translation of KR20160032832A (Year: 2016).*

* cited by examiner

LOCATION ASSISTANCE SYSTEM

INTRODUCTION

The present disclosure relates to a system and a method for location assistance. In certain situations, a global positioning satellite (GPS) location alone may be insufficient for first responders to find a vehicle or vehicle occupants in distress. For example, where the distress vehicle/occupant is in a warehouse, the GPS location may not provide enough information to determine a correct floor of the warehouse to find the vehicle/occupant.

Accordingly, those skilled in the art continue with research and development efforts in the field of directing first responders to locations of distress vehicles with the assistance of neighboring vehicles.

SUMMARY

A location assistance system is provided herein. The location assistance system includes a distress vehicle and a plurality of assistance vehicles. The distress vehicle is operable to broadcast an emergency signal in response to an emergency situation. The plurality of assistance vehicles is in proximity of the distress vehicle. Each of the plurality of assistance vehicles has a plurality of lights. The plurality of assistance vehicles is operable to receive the emergency signal from the distress vehicle, determine a plurality of distances from the plurality of assistance vehicles to the distress vehicle based on the emergency signal, triangulate among the plurality of assistance vehicles to generate a spatial map of the distress vehicle relative to the plurality of assistance vehicles based on the plurality of distances, determine one or more approximately horizontal lines in the spatial map that include the distress vehicle and at least one horizontally aligned assistance vehicle of the plurality of assistance vehicles in response to the distress vehicle and the at least one horizontally aligned assistance vehicle being on a same vertical level in the spatial map, coordinate among the plurality of assistance vehicles to determine one or more horizontal sequences along the one or more approximately horizontal lines from furthest to nearest the distress vehicle, and flash the plurality of lights of the plurality of assistance vehicles in the one or more horizontal sequences to lead toward the distress vehicle.

In one or more embodiments of the location assistance system, the plurality of assistance vehicles is further operable to determine at least one vertical cone in the spatial map that includes the distress vehicle and at least one vertically aligned assistance vehicle of the plurality of assistance vehicles in response to the at least one vertically aligned assistance vehicle being on a different vertical level than the distress vehicle, and flash the plurality of lights of the plurality of assistance vehicles to lead toward the distress vehicle on the different vertical level.

In one or more embodiments of the location assistance system, the plurality of assistance vehicles includes a plurality of horns and the plurality of assistance vehicles is operable to honk the plurality of horns in the one or more horizontal sequences to lead toward the distress vehicle.

In one or more embodiments of the location assistance system, the plurality of assistance vehicles includes a plurality of motion detectors, and the plurality of assistance vehicles is operable to begin the flash of the plurality of lights in response to at least one of the motion detectors detecting movement toward the distress vehicle.

In one or more embodiments, the location assistance system further includes a help vehicle in communication with the plurality of assistance vehicles. The help vehicle is operable to access the spatial map to aid in locating the distress vehicle.

In one or more embodiments, the location assistance system further includes a radio-frequency identification tag operable to transmit an identification signal to the plurality of assistance vehicles. The identification signal indicates that a first responder is present. The plurality of assistance vehicles is further operable to receive the identification signal at one or more of the plurality of assistance vehicles, and begin the flash of the plurality of lights in response to reception of the identification signal.

In one or more embodiments of the location assistance system, at least one of the plurality of assistance vehicles is an autonomous vehicle operable to lead a first responder to the distress vehicle.

In one or more embodiments of the location assistance system, the plurality of assistance vehicles includes a plurality of speakers, and the plurality of assistance vehicles is operable to generate a plurality of audio alerts through the plurality of speakers in the one or more horizontal sequences to lead toward the distress vehicle.

In one or more embodiments of the location assistance system, the plurality of assistance vehicles is further operable to detect an end of the emergency situation, and stop the flash of the plurality of lights in response to the end.

A method for location assistance is provided herein. The method includes broadcasting an emergency signal from a distress vehicle in response to an emergency situation, and receiving the emergency signal from the distress vehicle at a plurality of assistance vehicles. Each of the plurality of assistance vehicles has a plurality of lights. The method includes determining a plurality of distances from the plurality of assistance vehicles to the distress vehicle based on the emergency signal, triangulating among the plurality of assistance vehicles to generate a spatial map of the distress vehicle relative to the plurality of assistance vehicles based on the plurality of distances, determining one or more approximately horizontal lines in the spatial map that include the distress vehicle and at least one horizontally aligned assistance vehicle of the plurality of assistance vehicles in response to the distress vehicle and the at least one horizontally aligned assistance vehicle being in a same vertical level in the spatial map, coordinating among the plurality of assistance vehicles to determine one or more horizontal sequences along the one or more approximately horizontal lines from furthest to nearest the distress vehicle, and flashing the plurality of lights of the plurality of assistance vehicles in the one or more horizontal sequences to lead toward the distress vehicle.

In one or more embodiments, the method further includes determining at least one vertical cone in the spatial map that includes the distress vehicle and at least one vertically aligned assistance vehicle of the plurality of assistance vehicles in response to the at least one vertically aligned assistance vehicle being on a different vertical level than the distress vehicle, and flashing the plurality of lights of the plurality of assistance vehicles to lead toward the distress vehicle on the different vertical level.

In one or more embodiments of the method, the plurality of assistance vehicles includes a plurality of horns. The method further includes honking the plurality of horns in the one or more horizontal sequences to lead toward the distress vehicle.

In one or more embodiments of the method, the plurality of assistance vehicles includes a plurality of motion detectors. The method further includes beginning the flashing of the plurality of lights in response to at least one of the motion detectors detecting movement toward the distress vehicle.

In one or more embodiments, the method further includes establishing communications between the plurality of assistance vehicles and a help vehicle, and accessing the spatial map at the help vehicle to aid in locating the distress vehicle.

In one or more embodiments, the method further includes transmitting an identification signal from a radio-frequency identification tag. The identification signal indicates that a first responder is present. The method further includes receiving the identification signal at one or more of the plurality of assistance vehicles, and beginning the flashing of the plurality of lights in response to reception of the identification signal.

In one or more embodiments, the method further includes leading a first responder to the distress vehicle with an autonomous vehicle of the plurality of assistance vehicles.

A location device is provided herein. The location device includes a plurality of lights, a transceiver, and a controller. The transceiver is operable to communicate with a distress vehicle and a plurality of additional location devices located in proximity to the distress vehicle. The controller is in communication with the plurality of lights and the transceiver. The controller is operable to receive an emergency signal from the distress vehicle through the transceiver, determine a distance to the distress vehicle based on the emergency signal, triangulate with the plurality of additional location devices to generate a spatial map of the distress vehicle relative to the location device and the additional location devices based on the distance, determine an approximately horizontal line in the spatial map that includes the distress vehicle and the location device in response to the distress vehicle and the location device both being in a same vertical level in the spatial map, coordinate with the plurality of additional location devices to determine a horizontal sequence along the approximately horizontal line from furthest to nearest to the distress vehicle, and flash one or more of the plurality of lights of the location device in the horizontal sequence to lead toward the distress vehicle.

In one or more embodiments of the location device, the controller is further operable to determine at least one vertical cone in the spatial map that includes the distress vehicle and the location device in response to the location device being on a different vertical level than the distress vehicle, and flash the plurality of lights of the location device to lead toward the distress vehicle on the different vertical level.

In one or more embodiments, the location device further includes a horn. The controller is further operable to honk the horn in the horizontal sequence to lead toward the distress vehicle.

In one or more embodiments, the location device further includes a motion detector operable to detect movement toward the distress vehicle. The controller is further operable to begin the flash of the one or more of the plurality of lights in response to the motion detector detecting the movement toward the distress vehicle.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure provide a location assistance system that supports first responders trying to locate a vehicle involved in an emergency situation. The location assistance system assists the first responders by using inter-vehicle wireless technologies, such as Bluetooth Low Energy (BLE), Wi-Fi and vehicle-to-vehicle (V2V), to communicate with other vehicles in the neighborhood. Using the connected family of vehicles, a coordinated flashing of lights and/or sound effects from the nearby vehicles may be initiated. The lights and/or sounds may lead the first responders toward the distress vehicle. In various embodiments, proximity sensors of the neighboring vehicles may be used to determine locations of the first responders and help direct the first responders toward the distress vehicle. In some embodiments, a nearby autonomous vehicle may lead the first responders to the distress vehicle.

Figure 1:
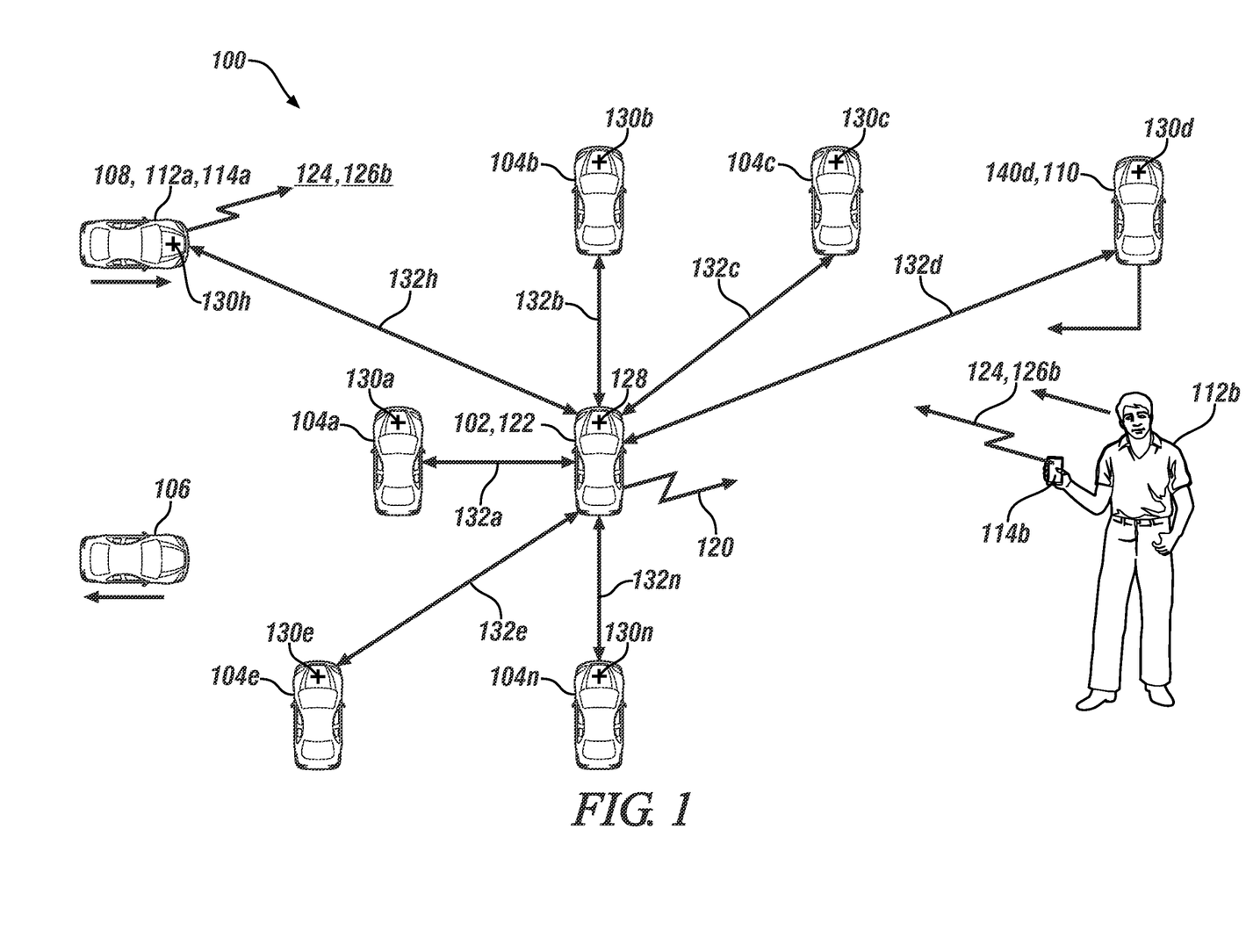
FIG. 1 is a schematic plan diagram illustrating a location assistance system in accordance with one or more exemplary embodiments.

Referring to FIG. 1, a schematic plan diagram illustrating a location assistance system 100 is shown in accordance with one or more exemplary embodiments. The location assistance system 100 generally includes a distress vehicle 102, one or more assistance vehicles 104a-104n, one or more optional moving vehicles 106 (one shown), one or more help vehicles 108 (one shown), one or more autonomous vehicles 110 (one shown), one or more first responders 112a-112b, and one or more radio-frequency identification tags 114a-114b.

The distress vehicle 102 is operable to generate and broadcast an emergency signal 120 that is received by the assistance vehicles 104a-104n. The emergency signal 120 conveys an alert that the distress vehicle 102, or someone inside the distress vehicle 102, is experiencing an emergency situation 122 and is requesting help. A stop signal 124 may be generated and broadcast by the distress vehicle 102, one or more of the help vehicles 108 and/or one or more of the identification tags 114a-114b. The stop signal 124 is received by the distress vehicle 102, the assistance vehicles 104a-104n, the help vehicles 108, and the radio-frequency identification tags 114a-114b. The stop signal 124 generally indicates that the emergency situation 122 has ended. Each radio-frequency identification tags 114a-114b may generate and broadcast a respective identification signal 126a-126b. The identification signals 126a-126b notify the assistance vehicles 104a-104n, and optionally the distress vehicle 102, that a respective first responder 112a-112b is in the vicinity.

The distress vehicle 102 is a stationary vehicle that is experiencing the emergency situation 122. The emergency situation 122 may be with the vehicle itself and/or with one or more people in or around the distress vehicle 102. The emergency signal 120 is generated and broadcast from a distress vehicle location 128 when the emergency situation 122 is detected. The detection may be automatic by circuitry within the distress vehicle 102 and/or a manual detection (e.g., a driver presses a button to request assistance).

The assistance vehicles 104a-104n are vehicles neighboring the distress vehicle 102. The assistance vehicles 104a-104n may initially be at rest and located at assistance vehicle locations 130a-130n when the emergency signal 120 is received. Distances 132a-132n from the various assistance vehicles 104a-104n to the distress vehicle 102 may range from approximately a meter to several tens of meters (e.g., 50 meters). In response to receiving the emergency signal 120, the assistance vehicles 104a-104n determine the distances 132a-132n to the distress vehicle 102 based on respective strengths of the emergency signal 120 as received, triangulate among the assistance vehicles 104a-104n to generate a spatial map of the distress vehicle 102 relative to the assistance vehicles 104a-104n based on the distances 132a-132n, determine one or more lines and/or cones in the spatial map that include the distress vehicle 102 and at least one aligned assistance vehicle (e.g., 104a), coordinate among the assistance vehicles 104a-104n to determine one or more sequences along the lines and/or cones from a furthest distance to a nearest distance to the distress vehicle 102, and generate alerts in the sequences to lead the first responders 112a-112b toward the distress vehicle 102.

The moving vehicles 106 are vehicles in the neighborhood of the distress vehicle 102 that are in motion. Since the moving vehicles 106 do not remain at stable locations, the moving vehicles 106 generally ignore the emergency signal 120. By way of example, the moving vehicles 106 may be too far away from the distress vehicle 102 at the time that the first responders 112a-112b arrive to offer aid in locating the distress vehicle 102.

The help vehicles 108 are vehicles that carry one or more of the first responders (e.g., 112a) to help with the emergency situation 122. The help vehicles 108 may utilize the assistance vehicles 104a-104n as an aid in locating the distress vehicle 102. In various embodiments, the help vehicles 108 may access the spatial map generated by the assistance vehicles 104a-104n in order to determine where the distress vehicle 102 is located relative to the assistance vehicles 104a-104n. In some embodiments, the help vehicles 108 may generate and broadcast the stop signal 124 once the emergency situation 122 has ended and/or the support of the assistance vehicles 104a-104n is no longer appropriate.

The autonomous vehicles 110 implement vehicles with self-driving capabilities. Upon detection of an identification signal 126a-126b and/or detection of the help vehicle 108 moving toward the distress vehicle 102, one or more of the autonomous vehicles 110 may start and drive to the distress vehicle location 128. In response to one or more of the first responders 112a-112b arriving at the distress vehicle 102, the autonomous vehicles 110 may return to where were it was originally parked.

The first responders 112a-112b are people who assist the distress vehicle 102. In some embodiments, the first responders 112a-112b may include medical personnel where the emergency situation 122 involves a person in or near the distress vehicle 102. In other embodiments, the first responders 112a-112b may include vehicle repair and/or towing personnel where the emergency situation 122 involves the distress vehicle 102 being unable to move. In still other embodiments, the first responders 112a-112b may include firefighting personnel where the emergency situation 122 involves a fire at the distress vehicle 102. Some first responders (e.g., 112a) may ride in the help vehicles 108. Other first responders (e.g., 112b) may be on foot.

The radio-frequency identification tags 114a-114b implement transceivers worn or carried by the first responders 112a-112b and/or carried in the help vehicles 108. The radio-frequency identification tags 114a-114b are operational to transmit the identification signals 126a-126b that alert the distress vehicle 102, the assistance vehicles 104a-104n, and the autonomous vehicles 110 that help is nearby. The radio-frequency identification tags 114a-114b are operational to transmit the stop signal 124 to notify the distress vehicle 102, the assistance vehicles 104a-104n, the help vehicles 108, and the autonomous vehicles 110 that the emergency situation 122 has ended.

Figure 2:
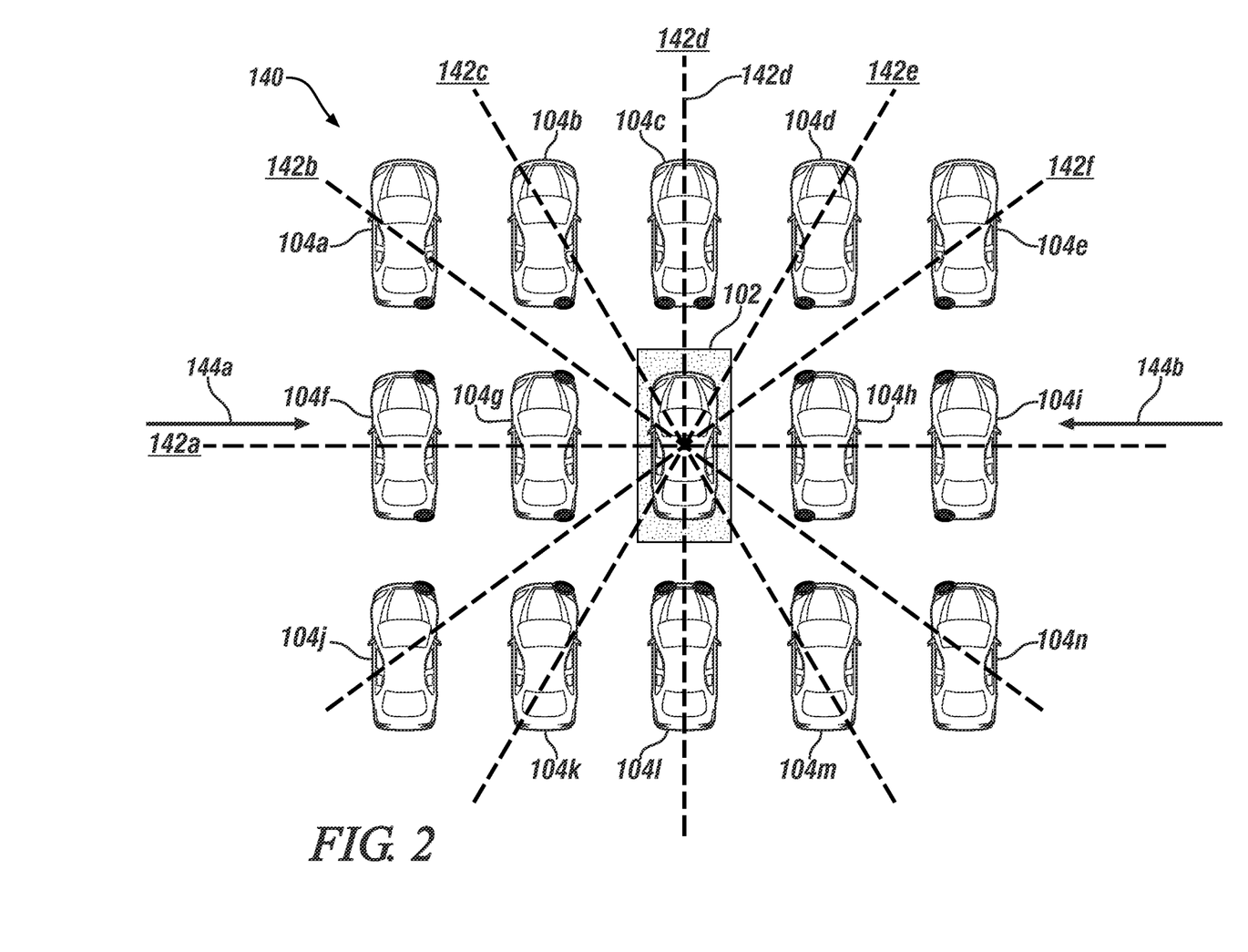
FIG. 2 is a schematic plan diagram of a parking lot in accordance with one or more exemplary embodiments.

Referring to FIG. 2, a schematic plan diagram of an example situation in a parking lot 140 is shown in accordance with one or more exemplary embodiments. The distress vehicle 102 may be surrounded by one or more assistance vehicles 104a-104n. Multiple horizontal lines 142a-142f may be considered to pass through the distress vehicle 102. Although six horizontal lines 142a-142f are illustrated in the example, other numbers of the horizontal lines 142a-142f may be implemented to meet a design criteria of a particular application.

Along the horizontal lines 142a-142f, zero, one or more horizontally aligned assistance vehicles (e.g., 104f, 104g, 104h and 104i along horizontal line 142a) may be aligned with the distress vehicle 102. The horizontally aligned assistance vehicles 104a-104n along the horizontal lines 142a-142f generally form horizontal sequences 144a-144b. The horizontal sequences 144a-144b extend from an assistance vehicle 104a-104n furthest away from the distress vehicle 102 to a closest assistance vehicle 104a-104n. For example, a horizontal sequence 144a may start with the assistance vehicle 104f (furthest) and end with the assistance vehicle 104g (closest). Another horizontal sequence 144b may start with the assistance vehicle 104i (furthest) and end with the assistance vehicle 104h (closest). Similar horizontal sequences 144a-144b may be established along the other horizontal lines 142a-142f.

Once the distress vehicle location 128, the assistance vehicle locations 130a-130n, and the horizontal sequences 144a-144b are known, the assistance vehicles 104a-104n may activate visual and/or audio alerts in the horizontal sequences 144a-144b to aid in directing the first responders 112a-112b toward the distress vehicle 102. For example, the assistance vehicles 104f to 104g located to the left of the distress vehicle 102 flash right turn signals and/or honk horns in a sequence starting with the furthest assistance vehicles 104f, then the next closest assistance vehicle, and so on until the closest assistance vehicle 104g flashes the right turn signal. Thereafter, the sequence would be repeated. As such, the first responders 112a-112b would see a string of blinking turn signals and hear a string of honks flowing toward the distress vehicle 102.

Assistance vehicles 104h to 104i located to the right of the distress vehicle 102 would flash left turn signals and/or honk horns in a similar sequence starting from the furthest assistance vehicle 104i, then the next closets assistance vehicle, and so on until the closest assistance vehicle 104h flashes the left turn signal and/or honks the horn. The assistance vehicles 104a to 104f in front of the distress vehicle 102 would flash one or both brake lights in a sequence. The assistance vehicles 104j to 104n behind the distress vehicle 102 may flash one or both turn signals in another sequence.

Figure 3:
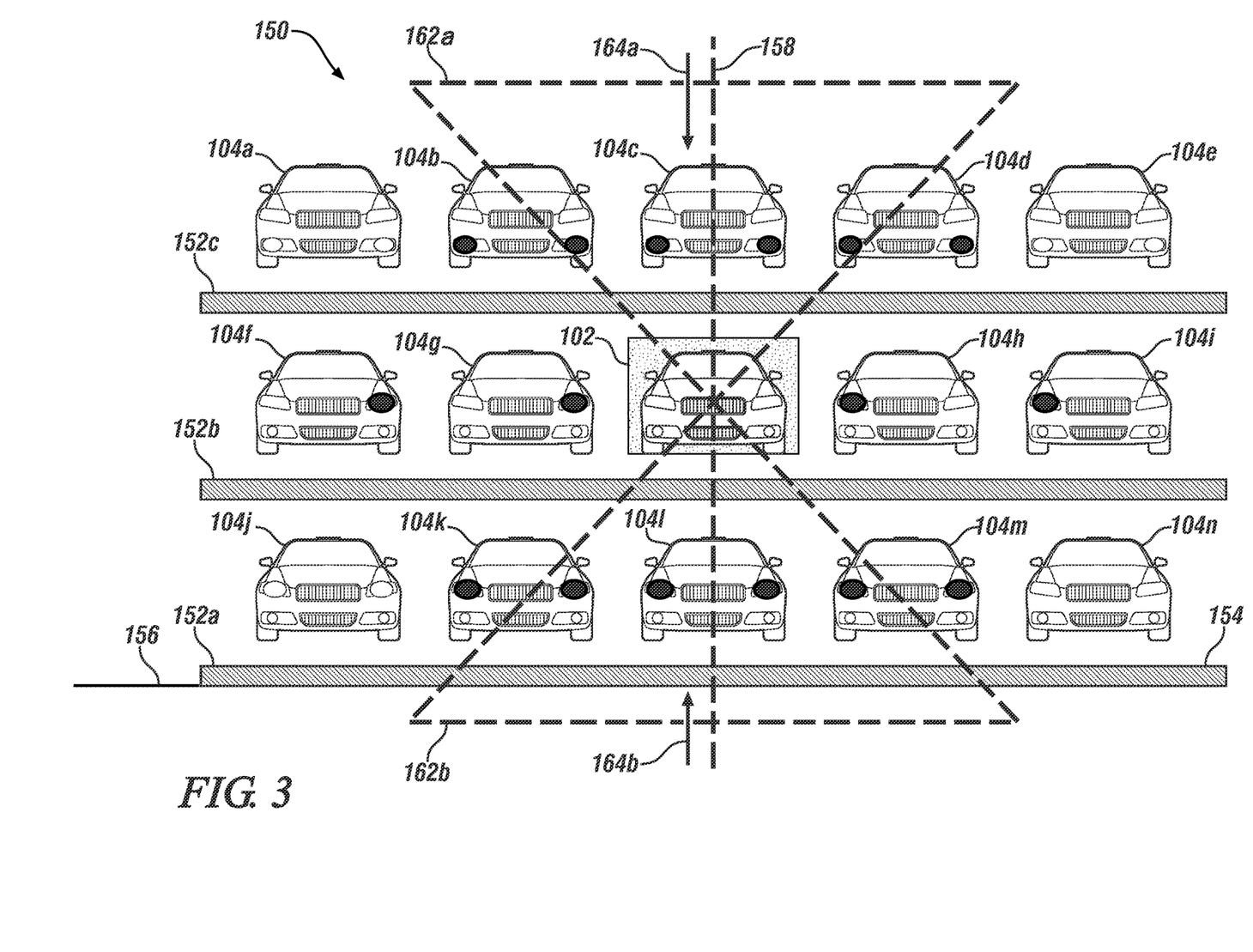
FIG. 3 is a schematic side diagram of a parking structure in accordance with an exemplary embodiment.

Referring to FIG. 3, a schematic side diagram of an example situation in a parking structure 150 is shown in accordance with an exemplary embodiment. The parking structure 150 may include multiple levels 152a-152c. In various embodiments, the levels 152a-152c are above ground 154. In other embodiments, one or more levels 152a-152c are below the ground 154. The distress vehicle 102 is located on one of the levels (e.g., 152b in the example).

The levels 152a-152c are generally parallel in a horizontal plane 156. A normal line 158 to the horizontal plane 156 may be defined passing through the distress vehicle 102. Two vertical cones 162a-162b may originate at the distress vehicle 102, one cone 162a spreading out above the distress vehicle 102, the other cone 162b spreading out below the distress vehicle 102. An example angle of the vertical cones 162a-162b may be approximately 30 degrees. Other angles may be implemented to meet a design criteria of a particular application.

Within the vertical cones 162a-162b, zero, one or more vertically aligned assistance vehicles (e.g., 104b-104d in vertical cone 162a, and 104k-104m in vertical cone 162b) may be vertically aligned with the distress vehicle 102. The vertically aligned assistance vehicles 104a-104n within the vertical cones 162a-162b generally form vertical sequences 164a-164b. The vertical sequences 164a-164b extend from the assistance vehicles 104a-104n on the levels (e.g., 152a and 152c) furthest away from the distress vehicle 102 to a closest assistance vehicle 104a-104n. For example, a vertical sequence 164a may start with the assistance vehicles 104b-104d on a different level 152c than the level 152b on which the distress vehicle 102 sits. Another vertical sequence 164b may start with the assistance vehicles 104k-104m on the level 152a below the distress vehicle 102. As shown in FIG. 2, the assistant vehicle 104a-104n on the same level 152b as the distress vehicle 102 may form the horizontal sequences 144a-144b.

Once the distress vehicle location 128, the assistance vehicle locations 130a-130n, and the vertical sequences 164a-164b are known, the assistance vehicles 104a-104n may activate the visual and/or audio alerts in the vertical sequences 164a-164n to aid in directing the first responders 112a-112b toward the level 152b where the distress vehicle 102 resides. For example, the assistance vehicles 104b-104d located above the distress vehicle 102 would flash fog lights and/or honk horns in the vertical sequence 164a starting with the assistance vehicles 104a-104n on a highest level 152a-152c above the distress vehicle 102, then the next level down, and so on until the assistance vehicles 104a-104n on the level 152a-152c immediately above the distress vehicle 102 flash the fog lights and/or honk the horns. Thereafter, the sequence would be repeated. A first responder 112a-112b finding themselves on a different vertical level than the distress vehicle 102 would see the fog lights flashing (e.g., the distress vehicle 102 is below) and hear a string of honks flowing downward.

Assistance vehicles 104k to 104m located on a lowest level below the distress vehicle 102 would flash headlights in a similar sequence starting from the furthest level 152a, then the next closest level, and so on until the closest assistance vehicle 104k-104l flashes the headlights (e.g., the distress vehicle 102 is above) and/or honk the horns. The sequence may subsequently be repeated.

Figure 4:
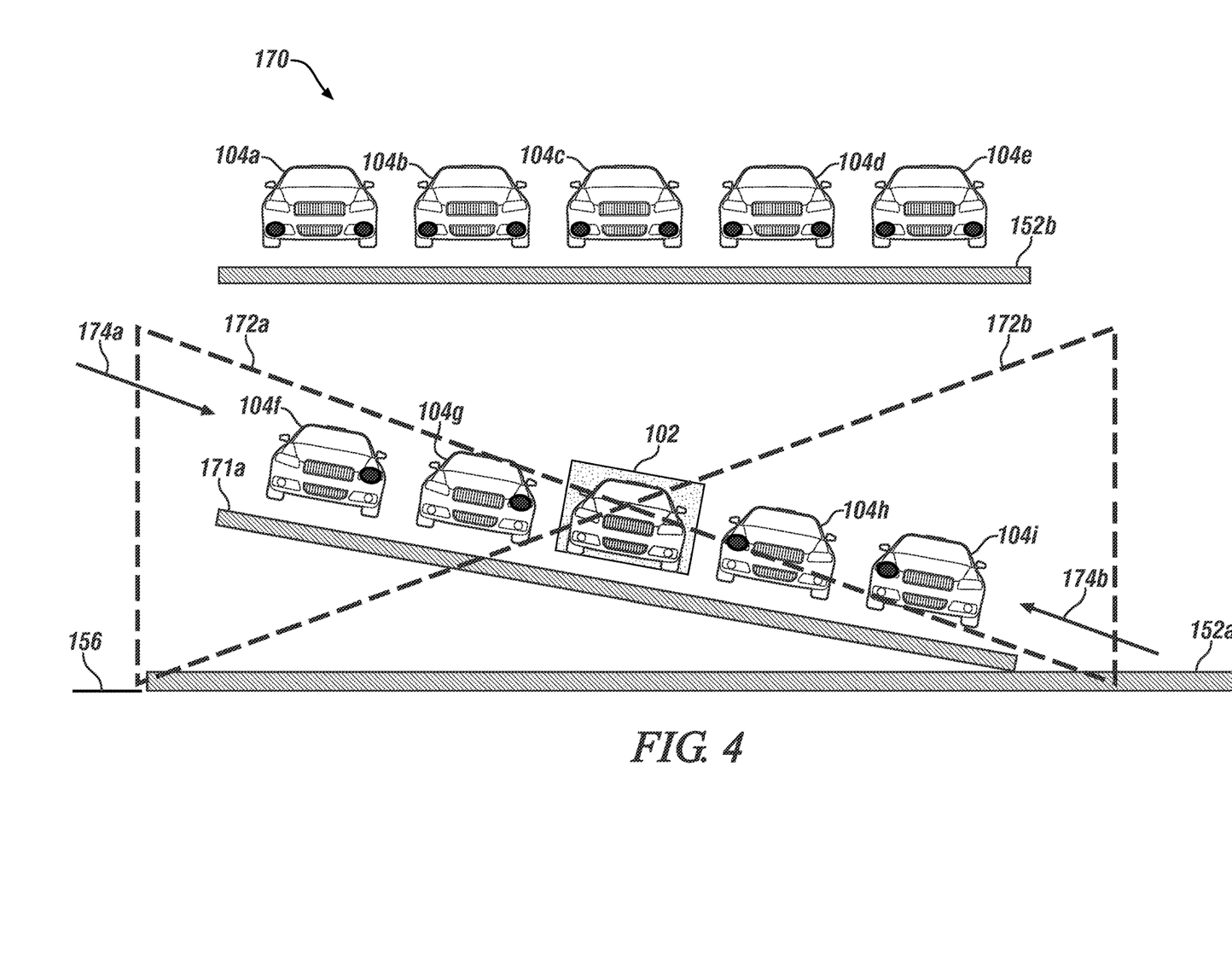
FIG. 4 is a schematic side diagram of a parking ramp in accordance with an exemplary embodiment.

Referring to FIG. 4, a schematic side diagram of an example situation on a parking ramp 170 is shown in accordance with an exemplary embodiment. The parking ramp 170 may include the multiple levels 152a-152c (two shown) parallel to the horizontal plane 156, and angled ramps 171a (one shown) between neighboring levels 152a-152c. The distress vehicle 102 is located on one of the ramps (e.g., 171a in the example).

Two angled cones 172a-172b may originate at the distress vehicle 102, one cone 172a spreading out to a right of the distress vehicle 102, the other cone 172b spreading out to a left of the distress vehicle 102. An example angle of the angled cones 172a-172b may be approximately 50 degrees. Other angles may be implemented to meet a design criteria of a particular application. The angle of the angled cones 172a-172b generally takes into account the assistance vehicles 104h-104i on the ramp 171a.

Within the angled cones 172a-172b, zero, one or more angularly aligned assistance vehicles (e.g., 104d-104e in angled cone 172b) may be aligned with the distress vehicle 102. The angularly aligned assistance vehicles 104a-104n within the angled cones 172a-172b generally form angled sequences 174a-174b. The angled sequences 174a-174b extend from the assistance vehicles 104a-104n on the assistance vehicles 104a-104n on the ramp 171a furthest away from the distress vehicle 102 to a closest assistance vehicle 104a-104n. For example, the angled sequence 174b may start with the assistance vehicle 104h and extend to the assistance vehicle 104i.

Once the distress vehicle location 128, the assistance vehicle locations 130a-130n, and the angled sequences 174a-174b are known, the assistance vehicles 104a-104n may assert visual and/or audio alerts in the angled sequences 174a-174b to aid in directing the first responders 112a-112b toward the distress vehicle 102. For example, the assistance vehicles 104h-104i located below the distress vehicle 102 on the ramp 171a would flash the turn signals and/or honk the horns in the angled sequence 174b starting with the assistance vehicles 104a-104n furthest from the distress vehicle 102, then the next closest assistance vehicle 104a-104n, and so on until the assistance vehicle 104d on the ramp 171a closet to the distress vehicle 102 flashes the turn signals and/or honks the horns. Thereafter, the sequence would be repeated. A first responder 112a-112b searching on a level (e.g., 152a), while the distress vehicle 102 is on the ramp 171a between levels 152a and 152b, would see the turn signals flashing and hear the honks progressing up the ramp 171a.

Figure 5:
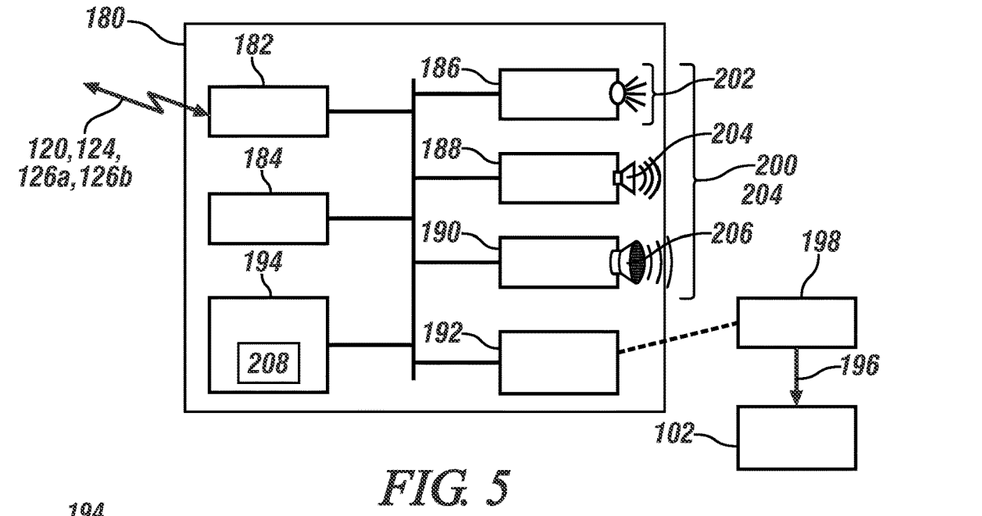
FIG. 5 is a schematic diagram of a location device in accordance with one or more exemplary embodiments.

Referring to FIG. 5, a schematic diagram of an example implementation of a location device 180 is shown in accordance with one or more exemplary embodiments. The location device 180 is operational to provide alerts 200 that assist the first responders 112a-112b to find the distress vehicle 102. The location device 180 may be implemented in the assistance vehicles 104a-104n, the help vehicles 108, and in some cases in the distress vehicle 102. The location device 180 includes a transceiver 182, a controller 184, multiple lights 186, a horn 188, one or more optional speakers 190, and multiple motion detectors 192. The location devices 180 implemented in at least the help vehicles 108 further include a display 194.

The transceiver 182 implements a bidirectional wireless communication device. The transceiver 182 is in communication with the controller 184 to send and receive messages. The transceiver 182 may implement Bluetooth Low Energy communications, Wi-Fi communications, vehicle-to-vehicle communications or other short range communication standards. The transceiver 182 is operational to receive the emergency signal 120, the stop signal 124, and the identification signals 126a-126b. A distance 132a-132n (FIG. 1) from the transceiver 182 to the distress vehicle 102 may be determined by the transceiver 182 based on a strength of the emergency signal 120. Each transceiver 182 is also in wireless communication with the other transceivers 182 in the other assistance vehicles 104a-104n, the distress vehicle 102 (if equipped) and the help vehicles 108. The communication among the assistance vehicles 104a-104n, the distress vehicle 102, and the help vehicles 108 enables coordination among the vehicles to determine a spatial map of where each vehicle is located relative to the distress vehicle 102.

The controller 184 implements one or more electronic control units. The controller 184 is operational to receive the emergency signal 120, the stop signal 124 and the identification signals 126a-126b through the transceiver 182. The controller 184 receives the distances 132a-132n to the distress vehicle 102 as measured by the transceiver 182. The controller 184 also communicates with the other controllers 184 through the transceiver 182. The controller 184 uses the gathered information to generate the spatial map that includes the assistance vehicle locations 130a-130n and the distress vehicle location 128. The spatial map may be shared among the controllers 184 in the assistance vehicles 104a-104n, the help vehicles 108, and the distress vehicle 102 (where capable).

In various embodiments, the controller 184 generally includes at least one microcontroller. The at least one microcontroller may include one or more processors, each of which may be embodied as a separate processor, an application specific integrated circuit (ASIC), a field programmable gate array (FPGA), or a dedicated electronic control unit. The at least one microcontroller may be an electronic processor (implemented in hardware, software executing on hardware, or a combination of both). The at least one microcontroller may also include tangible, non-transitory memory, (e.g., read-only memory in the form of optical, magnetic, and/or flash memory). For example, the at least one microcontroller may include application-suitable amounts of random-access memory, read-only memory, flash memory and other types of electrically-erasable programmable read-only memory, as well as accompanying hardware in the form of a high-speed clock or timer, analog-to-digital and digital-to-analog circuitry, and input/output circuitry and devices, as well as appropriate signal conditioning and buffer circuitry.

Computer-readable and executable instructions embodying the present method may be recorded (or stored) in the memory and executed as set forth herein. The executable instructions may be a series of instructions employed to run applications on the at least one microcontroller (either in the foreground or background). The at least one microcontroller may receive commands and information, in the form of one or more input signals from various controls or components and communicate instructions to the other electronic components.

The lights 186 implement at least turn signals, headlights, taillights and fog lights. The lights 186 are operational to create visual alerts 202. The lights 186 are in communication with, and are controlled by the controller 184. The lights 186 are mounted around an exterior of the assistance vehicles 104a-104n and are visible from outside the assistance vehicles 104a-104n.

The horn 188 implements a standard automobile horn. The horn 188 is operational to generate honking alerts 204. The horn 188 is in communication with, and is controlled by the controller 184. The horn 188 is often disposed in an engine compartment of the assistance vehicles 104a-104n and may be heard from outside the assistance vehicles 104a-104n.

The speakers 190 implement acoustic speakers. The speakers 190 are in communication with, and are controlled by the controller 184. The speakers 190 may generate speech alerts 206 such as "left", "right", "behind", "ahead", "above", and "below". The speech alerts 206 may be heard from outside the assistance vehicles 104a-104n.

The motion detectors 192 implement close-proximity detection and direction sensors. The motion detectors 192 are in communication with the controller 184. The motion detectors 192 are operational to sense an object 198 (e.g., another vehicle or person) moving near one or more of the motion detectors 192. The motion detectors 192 are also operational to determine a direction 196 of the object 198. The controller 184 may use the detected motion and the reception of an identification signals 126a-126b to estimate if the object 198 is a help vehicle 108 and/or a first responder 112a-112b moving toward the distress vehicle 102.

The display 194 implements a visual display. The display 194 is generally implemented in at least the help vehicles 108. The display 194 may be operational to present graphical information 208. The graphical information 208 may include the spatial map and/or an arrow that points toward the distress vehicle 102.

Figure 6:
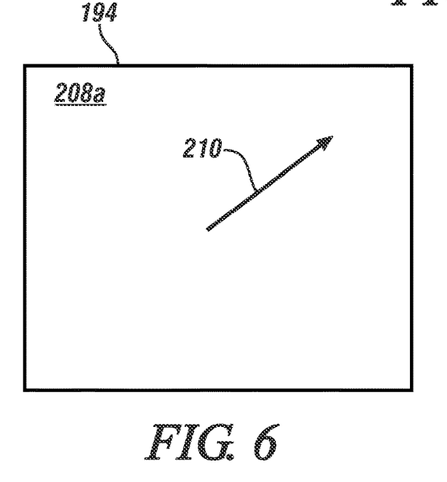
FIG. 6 is a schematic diagram of two-dimensional graphical information in accordance with one or more exemplary embodiments.

Referring to FIG. 6, a schematic diagram of an example two-dimensional graphical information 208a is shown in accordance with one or more exemplary embodiments. The graphical information 208a may be a variation of the graphical information 208. The graphical information 208a generally includes an arrow 210. The arrow 210 may be rotatable to point in a direction of the distressed vehicle 102. A driver of a help vehicle 108 uses the arrow 210 to navigate to the distress vehicle 102. Additional information, such as a distance 132h (FIG. 1) to the distress vehicle 102 may be included in the graphical information 208a.

Figure 7:
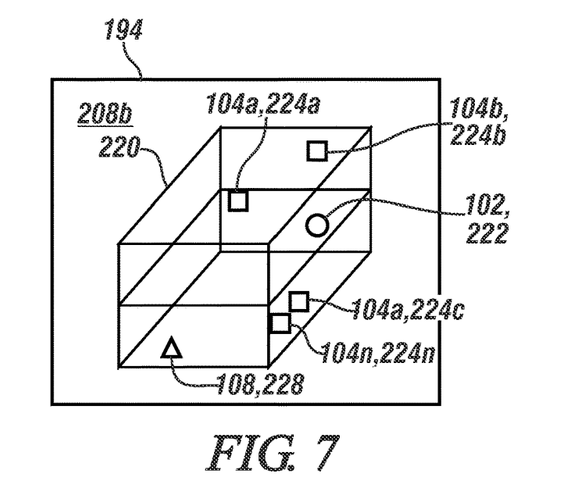
FIG. 7 is a schematic diagram of three-dimensional graphical information in accordance with one or more exemplary embodiments.

Referring to FIG. 7, a schematic diagram of an example three-dimensional graphical information 208b is shown in accordance with one or more exemplary embodiments. The graphical information 208b may be a variation of the graphical information 208. The graphical information 208b generally includes the spatial map 220 generated by the assistance vehicles 104a-104n. The spatial map 220 includes a distress vehicle icon 222 representing the distressed vehicle 102, one or more assistant vehicle icons 224a-224n representing the assistance vehicles 104a-104n in the vicinity, and a help vehicle icon 228 representing the help vehicle 108. The driver of the help vehicle 108 may use the spatial map 220 to navigate to the distress vehicle 102 on whatever level the distress vehicle 102 is located.

Figure 8:
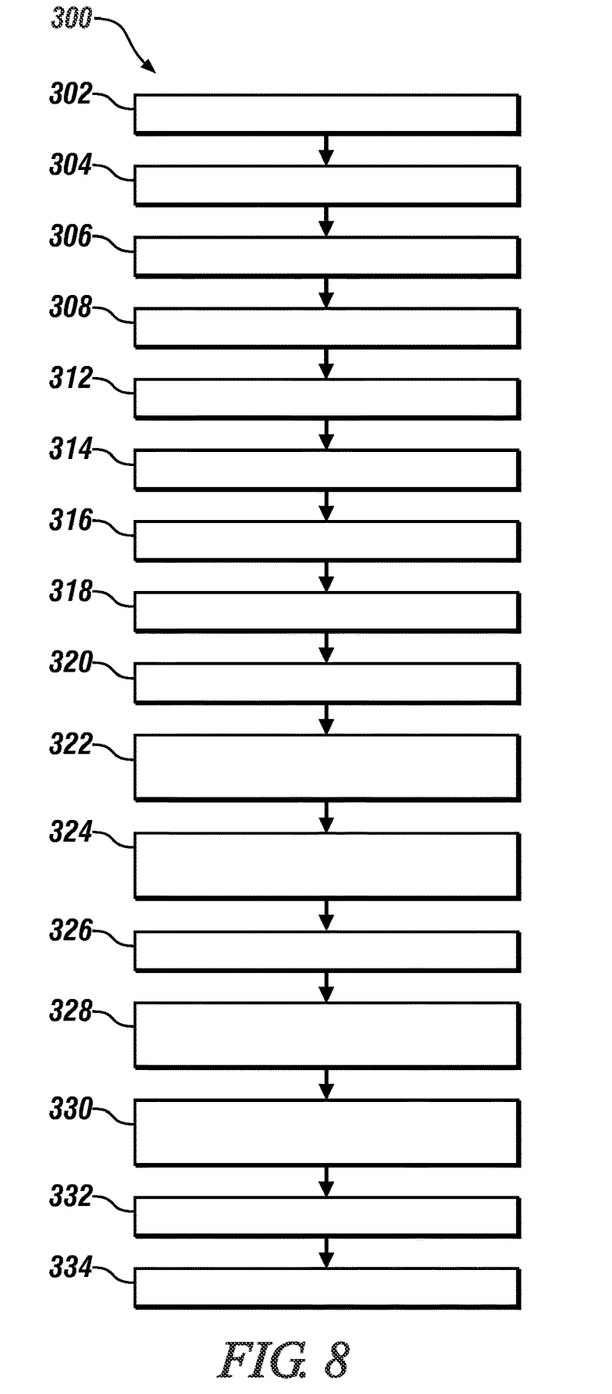
FIG. 8 is a flow diagram of a method for location assistance of a distress vehicle in accordance with one or more exemplary embodiments.

Referring to FIG. 8, a flow diagram of an example implementation of a method 300 for location assistance of the distress vehicle 102 is shown in accordance with one or more exemplary embodiments. The method (or process) 300 is implemented by the location assistance system 100. The method 300 includes steps 302 to 334, as illustrated. The sequence of steps is shown as a representative example. Other step orders may be implemented to meet the criteria of a particular application.

In the step 302, the distress vehicle 102 detects the emergency situation 122 (e.g., automatically or manually). The distress vehicle 102 broadcasts the emergency signal 120 to neighboring vehicles (e.g., the stationary assistance vehicles 104a-104n and the moving vehicles 106) in the step 304 (see FIG. 1). The neighboring vehicles receive the emergency signal 120 from the distress vehicle 102 at the step 306. The distances 132a-132n from the neighboring vehicles to the distress vehicle 102 are calculated in the step 308 based on the strengths of the emergency signals 120.

In the step 312, the distances 132a-132n are communicated among the neighboring vehicles. One or more of the stationary neighboring vehicles (e.g., the assistance vehicles 104a-104n) may discard (or filter out) the distances 132a-132n of the moving neighboring vehicles (e.g., the moving vehicles 106) in the step 314. In the step 316, triangulations of the distances 132a-132n from the assistance vehicles 104a-104n to the distress vehicle 102 are used to generate the spatial map 220.

In the step 318, one or more of the assistance vehicles 104a-104n determines one or more approximately horizontal lines 142a-142f and/or one or more angled cones 172a-172b in the spatial map 220. The horizontal lines 142a-142f and/or one or more angled cones 172a-172b that include the distress vehicle 102 and at least one aligned assistance vehicle 104a-104n are noted as being relevant to guiding the first responders 112a-112b in a correct direction.

In the step 320, one or more vertical cones 162a-162b in the spatial map 220 are determined. The vertical cones 162a-162b that include the distress vehicle 102 and at least one vertically aligned assistance vehicle 104a-104n are marked as being relevant to guiding the first responders 112a-112b to a correct level in a multi-level environment.

The assistance vehicles 104a-104n coordinate among themselves in the step 322 to determine one or more horizontal sequences 144a-144b along the one or more approximately horizontal lines 142a-142f and/or angled cones 162a-162n from furthest away to nearest to the distress vehicle 102. The assistance vehicles 104a-104n also coordinate among themselves in the step 324 to determine one or more vertical sequences 164a-164b in the vertical direction from a furthest level to a nearest level to the distress vehicle 102.

In the step 326, a timer is started. The alerts 200 (e.g., visual, honking and/or speech) of the assistance vehicles 104a-104n are activated in the step 328 in the horizontal sequences 144a-144b and/or angled sequences 174a-174n to direct nearby first responders 112a-112b, if any, toward the distress vehicle 102 on a current level (or plane). The alerts 200 of the assistance vehicles 104a-104n are activated in the vertical sequences 164a-164b in the step 330 to direct nearby first responders 112a-112b up or down to a different level 152a-152c. If the stop signal 124 is not received while the timer is active, the time expires in the step 332. In various embodiments, a length of the timer may be approximately 10 minutes. Other time lengths may be implemented to meet the design criteria of a particular application. In the step 334 the alerts 200 are stopped to conserve the battery power of the assistance vehicles 104a-104n.

Figure 9:
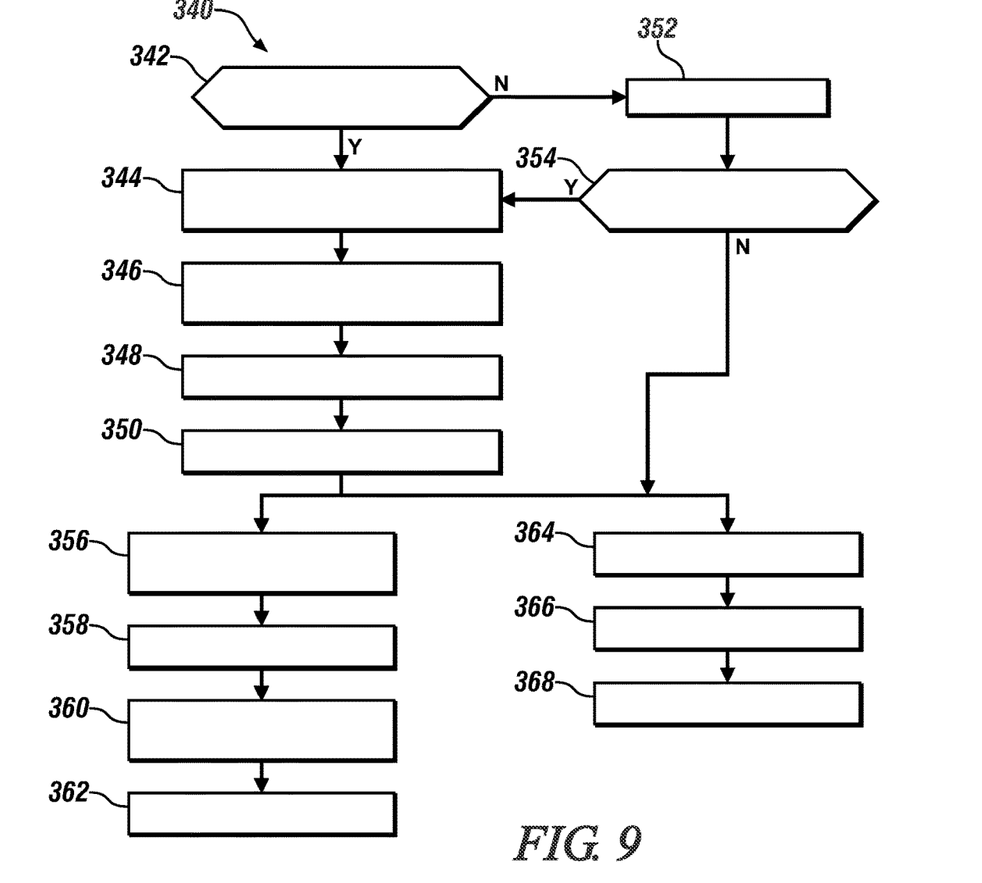
FIG. 9 is a flow diagram of a method for starting/stopping alerts in accordance with one or more exemplary embodiments.

Referring to FIG. 9, a flow diagram of an example implementation of a method 340 for starting/stopping the alerts 200 is shown in accordance with one or more exemplary embodiments. The method (or process) 340 is implemented by the location assistance system 100. The method 340 includes steps 342 to 368, as illustrated. The sequence of steps is shown as a representative example. Other step orders may be implemented to meet the criteria of a particular application.

In the step 342, a check is performed to determine if the assistance vehicles 104a-104n have received an identification signal 126a-126b from a first responder 112a-112b. Once the check is positive, the alerts 200 may begin in one or more horizontal sequences 144a-144b and/or angled sequences 174a-174n in the step 344 to lead the first responders 112a-112b toward the distress vehicle 102. The alerts 200 may also begin in one or more vertical sequences 164a-164n in the step 346 to direct the first responders 112a-112b up or down a level 152a-152c.

Where an autonomous vehicle 110 is present, the autonomous vehicle 110 may lead the first responders 112a-112b to the distress vehicle 102 in the step 348. Once the first responders 112a-112b have reached the distress vehicle 102, the autonomous vehicle 110 may return to an original location in the step 350.

If the check in the step 342 is negative, the method 340 may check for movement of an object 198 near the assistance vehicles 104a-104n in the step 352. If movement is detected, a check is performed in the step 354 to determine if the motion is toward the distress vehicle 102. If the motion is toward the distress vehicle 102, the alerts 200 may be triggered in the steps 344 and 346. If the motion is not toward the distress vehicle 102, the method 340 may determine if the emergency situation 122 has ended.

In the step 356, the distress vehicle 102 may sense (e.g., automatically and/or manually) and end of the emergency situation 122. If the emergency situation 122 has ended, the distress vehicle 102 may stop broadcasting the emergency signal 120 in the step 358. In the step 360, the assistance vehicles 104a-104n may sense the stoppage of the emergency signal 120. In the step 362, the assistance vehicles 104a-104n stop the alerts 200 in response to sensing a stoppage of the emergency signal 120.

In the step 364, the help vehicle 108 and/or a radio-frequency identification tags 114a-114b may transmit the stop signal 124. The assistance vehicles 104a-104n receive the stop signal 124 in the step 366. In response to receiving the stop signal 124, the assistance vehicles 104a-104n may stop the alerts 200 in the step 368.

Figure 10:
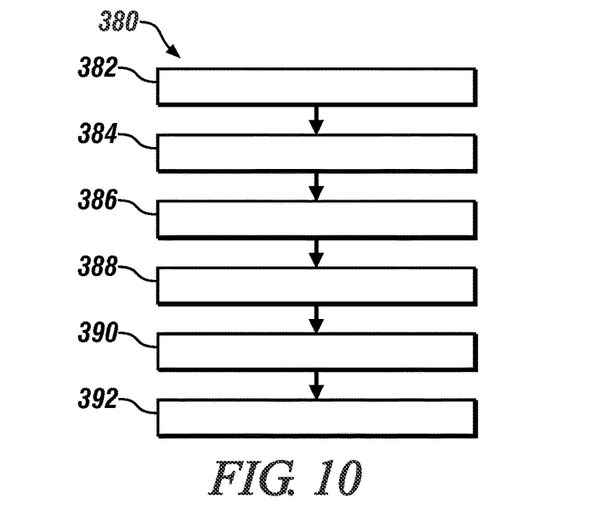
FIG. 10 is a flow diagram of a method for assimilation of a help vehicle into the location assistance system in accordance with one or more exemplary embodiments.

Referring to FIG. 10, a flow diagram of an example implementation of a method 380 for assimilation of a help vehicle 108 into the location assistance system 100 is shown in accordance with one or more exemplary embodiments. The method (or process) 380 is implemented by the location assistance system 100. The method 380 includes steps 382 to 390, as illustrated. The sequence of steps is shown as a representative example. Other step orders may be implemented to meet the criteria of a particular application.

In the step 382, a help vehicle 108 may arrive in the vicinity of the distress vehicle 102. The help vehicle 108 transmits an identification signal (e.g., 126a) in the step 384. The assistance vehicles 104a-104n receive the identification signal 126a in the step 386. Communications between the assistance vehicles 104a-104n and the help vehicle 108 is established in the step 388. The help vehicle 108 accesses the spatial map 220 in the step 390 to aid in locating the distress vehicle. In the step 392, the spatial map 220 or the arrow 210 is displayed to the driver of the help vehicle 108 to guide the help vehicle 108 toward the distress vehicle 102.

Embodiments of the location assistance system 100 may utilize Bluetooth Low Energy communications and/or wireless (e.g., wi-fi) communications to detect nearby vehicles. Signal strengths of the received emergency signal 120 are used to determine distances to the distressed vehicle 102. Vehicle lights are flashed to visually alert the first responders 112*a*-112*b* to the direction/location of the distress vehicle 102. Horns 188 or speakers 190 may also be used to acoustically alert the first responders 112*a*-112*b* toward the distress vehicle 102. Proximity sensors of the assistance vehicles 104*a*-104*n* may be utilized to detect nearby people and determine moving vectors. In various situations, a nearby autonomous vehicle 110 may lead the first responders 112*a*-112*b* to the distressed vehicle 102.

Embodiments of the disclosure generally provide a location assistance system. The location assistance system includes a distress vehicle and multiple nearby assistance vehicles. The distress vehicle broadcasts an emergency signal in response to detection of an emergency situation. Each assistance vehicle has a location device. The location device includes multiple lights, a horn and an optional speaker. The location device may receive the emergency signal from the distress vehicle, determine a distance to the distress vehicle based on a strength of the emergency signal, triangulate among the assistance vehicles to generate a spatial map of the distress vehicle relative to the assistance vehicles based on the distances, and determine one or more approximately horizontal lines in the spatial map that include the distress vehicle and at least one horizontally aligned assistance vehicle in response to the distress vehicle and the at least one horizontally aligned assistance vehicle being on a same vertical level in the spatial map. The location device may also coordinate among the assistance vehicles to determine one or more horizontal sequences along the one or more approximately horizontal lines from furthest to nearest the distress vehicle, and flash the lights, honk the horn, and/or broadcast spoken messages from the assistance vehicles in the one or more horizontal sequences to lead first responders toward the distress vehicle.

Numerical values of parameters (e.g., of quantities or conditions) in this specification, including the appended claims, are to be understood as being modified in each instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of values and further divided ranges within the entire range. Each value within a range and the endpoints of a range are hereby disclosed as a separate embodiment.

While the best modes for carrying out the disclosure have been described in detail, those familiar with the art to which this disclosure relates will recognize various alternative designs and embodiments for practicing the disclosure within the scope of the appended claims.

What is claimed is:

1. A location assistance system comprising:
   a distress vehicle operable to broadcast an emergency signal in response to an emergency situation; and
   a plurality of assistance vehicles in proximity of the distress vehicle, wherein each of the plurality of assistance vehicles has a plurality of lights, and the plurality of assistance vehicles is operable to:
   receive the emergency signal from the distress vehicle;
   determine a plurality of distances from the plurality of assistance vehicles to the distress vehicle based on the emergency signal;
   triangulate among the plurality of assistance vehicles to generate a spatial map of the distress vehicle relative to the plurality of assistance vehicles based on the plurality of distances;
   determine one or more approximately horizontal lines in the spatial map that include the distress vehicle and at least two horizontally aligned assistance vehicles-of the plurality of assistance vehicles in response to the distress vehicle and the at least two horizontally aligned assistance vehicles being on a same vertical level in the spatial map;
   coordinate among the at least two horizontally aligned assistance vehicles to determine one or more horizontal sequences along the one or more approximately horizontal lines from furthest away to nearest to the distress vehicle; and
   flash the plurality of lights of the at least two horizontally aligned assistance vehicles in the one or more horizontal sequences to direct toward the distress vehicle.

2. The location assistance system according to claim 1, wherein the plurality of assistance vehicles is further operable to:
   determine at least one vertical cone in the spatial map that includes the distress vehicle and at least one vertically aligned assistance vehicle of the plurality of assistance vehicles in response to the at least one vertically aligned assistance vehicle being on a different vertical level than the distress vehicle; and
   flash the plurality of lights of the at least one vertically aligned assistance vehicle to direct toward the distress vehicle on the different vertical level.

3. The location assistance system according to claim 1, wherein:
   the at least two horizontally aligned assistance vehicles further include a plurality of horns; and
   the at least two horizontally aligned assistance vehicles are further operable to honk the plurality of horns in the one or more horizontal sequences to direct toward the distress vehicle.

4. The location assistance system according to claim 1, wherein:
   the plurality of assistance vehicles further includes a plurality of motion detectors; and
   the at least two horizontally aligned assistance vehicles are further operable to begin the flashing of the plurality of lights in response to at least one of the motion detectors detecting movement toward the distress vehicle.

5. The location assistance system according to claim 1, further comprising:
   a help vehicle in communication with the plurality of assistance vehicles, wherein the help vehicle is operable to access the spatial map to aid in locating the distress vehicle.

6. The location assistance system according to claim 1, further comprising:
   a radio-frequency identification tag operable to transmit an identification signal to the plurality of assistance vehicles, wherein the identification signal indicates that a first responder is present, wherein the at least two horizontally aligned assistance vehicles are further operable to:
receive the identification signal at one or more of the at least two horizontally aligned assistance vehicles; and
begin the flashing of the plurality of lights in response to reception of the identification signal.

7. The location assistance system according to claim 1, wherein at least one of the plurality of assistance vehicles is an autonomous vehicle operable to lead a first responder to the distress vehicle.

8. The location assistance system according to claim 1, wherein:
the at least two horizontally aligned assistance vehicles further include a plurality of speakers; and
the at least two horizontally aligned assistance vehicles are further operable to generate a plurality of audio alerts through the plurality of speakers in the one or more horizontal sequences to direct toward the distress vehicle.

9. The location assistance system according to claim 1, wherein
the at least two horizontally aligned assistance vehicles are further operable to:
detect an end of the emergency situation; and
stop the flashing of the plurality of lights in response to the end.

10. A method for location assistance comprising:
broadcasting an emergency signal from a distress vehicle in response to an emergency situation;
receiving the emergency signal from the distress vehicle at a plurality of assistance vehicles, wherein each of the plurality of assistance vehicles has a plurality of lights;
determining a plurality of distances from the plurality of assistance vehicles to the distress vehicle based on the emergency signal;
triangulating among the plurality of assistance vehicles to generate a spatial map of the distress vehicle relative to the plurality of assistance vehicles based on the plurality of distances;
determining one or more approximately horizontal lines in the spatial map that include the distress vehicle and at least two horizontally aligned assistance vehicles of the plurality of assistance vehicles in response to the distress vehicle and the at least two horizontally aligned assistance vehicles being on a same vertical level in the spatial map;
coordinating among the at least two horizontally aligned assistance vehicles to determine one or more horizontal sequences along the one or more approximately horizontal lines from furthest away to nearest to the distress vehicle; and
flashing the plurality of lights of the at least two horizontally aligned assistance vehicles in the one or more horizontal sequences to direct toward the distress vehicle.

11. The method according to claim 10, further comprising:
determining at least one vertical cone in the spatial map that includes the distress vehicle and at least one vertically aligned assistance vehicle of the plurality of assistance vehicles in response to the at least one vertically aligned assistance vehicle being on a different vertical level than the distress vehicle; and
flashing the plurality of lights of the at least one vertically aligned assistance vehicle to direct toward the distress vehicle on the different vertical level.

12. The method according to claim 10, wherein the at least two horizontally aligned assistance vehicles further include a plurality of horns, and the method further comprises:
honking the plurality of horns in the one or more horizontal sequences to direct toward the distress vehicle.

13. The method according to claim 10, wherein the plurality of assistance vehicles further includes a plurality of motion detectors, and the method further comprises:
beginning the flashing of the plurality of lights in response to at least one of the motion detectors detecting movement toward the distress vehicle.

14. The method according to claim 10, further comprising:
establishing communications between the plurality of assistance vehicles and a help vehicle; and
accessing the spatial map at the help vehicle to aid in locating the distress vehicle.

15. The method according to claim 10, further comprising:
transmitting an identification signal from a radio-frequency identification tag, wherein the identification signal indicates that a first responder is present;
receiving the identification signal at one or more of the at least two horizontally aligned assistance vehicles; and
beginning the flashing of the plurality of lights in response to reception of the identification signal.

16. The method according to claim 10, further comprising:
leading a first responder to the distress vehicle with an autonomous vehicle of the plurality of assistance vehicles.

17. A location device comprising:
a plurality of lights;
a transceiver operable to communicate with a distress vehicle and a plurality of additional location devices located in proximity to the distress vehicle; and
a controller in communication with the plurality of lights and the transceiver, wherein the controller is operable to:
receive an emergency signal from the distress vehicle through the transceiver;
determine a distance to the distress vehicle based on the emergency signal;
triangulate with the plurality of additional location devices to generate a spatial map of the distress vehicle relative to the location device and the plurality of additional location devices based on the distance;
determine an approximately horizontal line in the spatial map that includes the distress vehicle, the location device, and at least one horizontally aligned additional location device of the plurality of additional location devices in response to the distress vehicle, the location device, and the at least one horizontally aligned additional location device being on a same vertical level in the spatial map;
coordinate with the at least one horizontally aligned additional location device to determine a horizontal sequence along the approximately horizontal line from furthest away to nearest to the distress vehicle; and
flash one or more of the plurality of lights of the location device in the horizontal sequence to direct toward the distress vehicle.

18. The location device according to claim 17, wherein the controller is further operable to:
- determine at least one vertical cone in the spatial map that includes the distress vehicle and the location device in response to the location device being on a different vertical level than the distress vehicle; and
- flash the plurality of lights of the location device to direct toward the distress vehicle on the different vertical level.

19. The location device according to claim 17, further including a horn, wherein
- the controller is further operable to honk the horn in the horizontal sequence to direct toward the distress vehicle.

20. The location device according to claim 17, further comprising:
- a motion detector operable to detect movement toward the distress vehicle, wherein
- the controller is further operable to begin the flashing of the one or more of the plurality of lights in response to the motion detector detecting the movement toward the distress vehicle.

* * * * *